Dec. 2, 1969 A. B. LUKENS 3,481,609

HIGH PRECISION RECORD PLAYER

Filed Nov. 4, 1968 3 Sheets-Sheet 1

INVENTOR.
Alfred B. Lukens
BY
Marshall, Wilson + Yeasting
Attorneys

INVENTOR.
Alfred B. Lukens
BY
Marshall, Wilson & Yeasting
Attorneys

INVENTOR.
Alfred B. Lukens
BY
Marshall, Wilson & Yeasting
Attorneys

United States Patent Office 3,481,609
Patented Dec. 2, 1969

3,481,609

HIGH PRECISION RECORD PLAYER

Alfred B. Lukens, 1303 Craigwood Road, Toledo, Ohio 43612

Substitute for abandoned application Ser. No. 443,039, Mar. 26, 1965. This application Nov. 4, 1968, Ser. No. 810,864
Int. Cl. G11b *3/62*
U.S. Cl. 274—39 4 Claims

ABSTRACT OF THE DISCLOSURE

This high precision record player comprises a turntable which is rotatable about a fixed axis, and a circular cylindrical record-locating spindle having a central axis. The spindle is selectively rotatably mounted on the turntable to rotate about an axis which is parallel to the central axis of the spindle and to the axis of rotation of the turntable and is displaced an equal distance from both the central axis of the spindle and the axis of rotation of the turntable.

The present application is a substitute application which replaces allowed application Ser. No. 443,039, filed Mar. 26, 1965, now abandoned.

The invention relates to a high precision record player, and more particularly to a turntable that is provided with apparatus for bringing a record into a position such that the center of symmetry of the grooves lies on the axis of rotation of the turntable.

One of the most objectionable phenomena that occur in the reproduction of music from a record is wavering of the pitch of the notes, commonly described as "wow," which results when the pilots hole at the middle of the record is not exactly concentric with the center of symmetry of the grooves on the record. The deviation of the center of the pilot hole from the center of symmetry of the grooves sometimes is as much as .03 inch. When a deviation of this magnitude is present in a record, a needle riding in a groove will be .03 inch farther than it should be from the axis of rotation when the needle is on one side of the record, and will be .03 inch closer than it should be to the axis of rotation when it is on the opposite side of the record. This results in a total variation of .06 inch in the radial distance of the needle from the axis of rotation of the turntable while the record is making a single rotation. It is evident that in the case of a groove having an average radius of 2 inches, a variation of .06 inch in the radial distance of the needle from the axis of rotation of the turntable represents a variation of 3% in the distance of the needle from the axis of rotation. This would result in a very objectionable "wow" or variation in the pitch of the notes, because it would cause a variation of 3% in the speed of the needle relative to the groove during a single rotation of the record.

The principal object of the invention is to provide simple and inexpensive apparatus to be installed on a record turntable for bringing the center of symmetry of the grooves on a record into correspondence with the axis of rotation of the turntable.

More specific objects and advantages are apparent from the following description, in which reference is had to the accompanying drawings illustrating a preferred embodiment of the invention.

FIG. 1 of the drawings is a perspective view of a turntable embodying the present invention.

Figure 1:
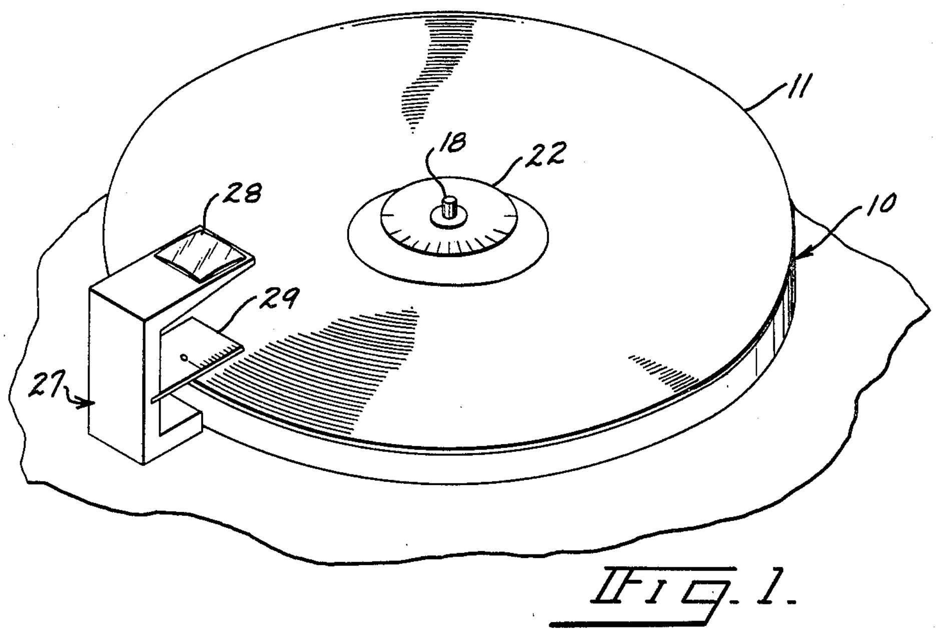

These specific drawings and the specific description that follows are intended to disclose and illustrate but not to limit the invention.

In the preferred form of apparatus shown in the drawings, a turntable 10 has its upper surface dished in the conventional manner so that when a record 11 is placed upon the turntable, only the peripheral edge of the record is supported by the turntable. The upper surface of the turntable 10 is provided with a bore 12 (FIG. 2) that is concentric with the axis *a* upon which the turntable rotates. A circular plate 13 mounted on the turntable 10 is provided with an integral boss 14 which fits in the bore 12. The boss 14 may have a pressed fit in the bore 12, but preferably it has a sliding fit in the bore so that the plate 13 may be rotated manually on the turntable. The upper surface of the turntable 10 surrounding the plate 13 is covered with the usual rubber mat 15.

The upper side of the plate 13 is provided with a bore 16, the axis *b* of which is displaced a small distance, preferably .015 inch, from the axis *a* of rotation of the turntable. A pin 17 extends into the bore 16, and also ex tends through a vertical bore provided in a spindle 18. The pin 17 functions as a pivot on which the spindle 18 may be turned. The main portion of the spindle 18 is cylindrical and is circular in horizontal section, and the upper end of the spindle may be knurled in order to facilitate manual turning of the spindle.

Figure 2:
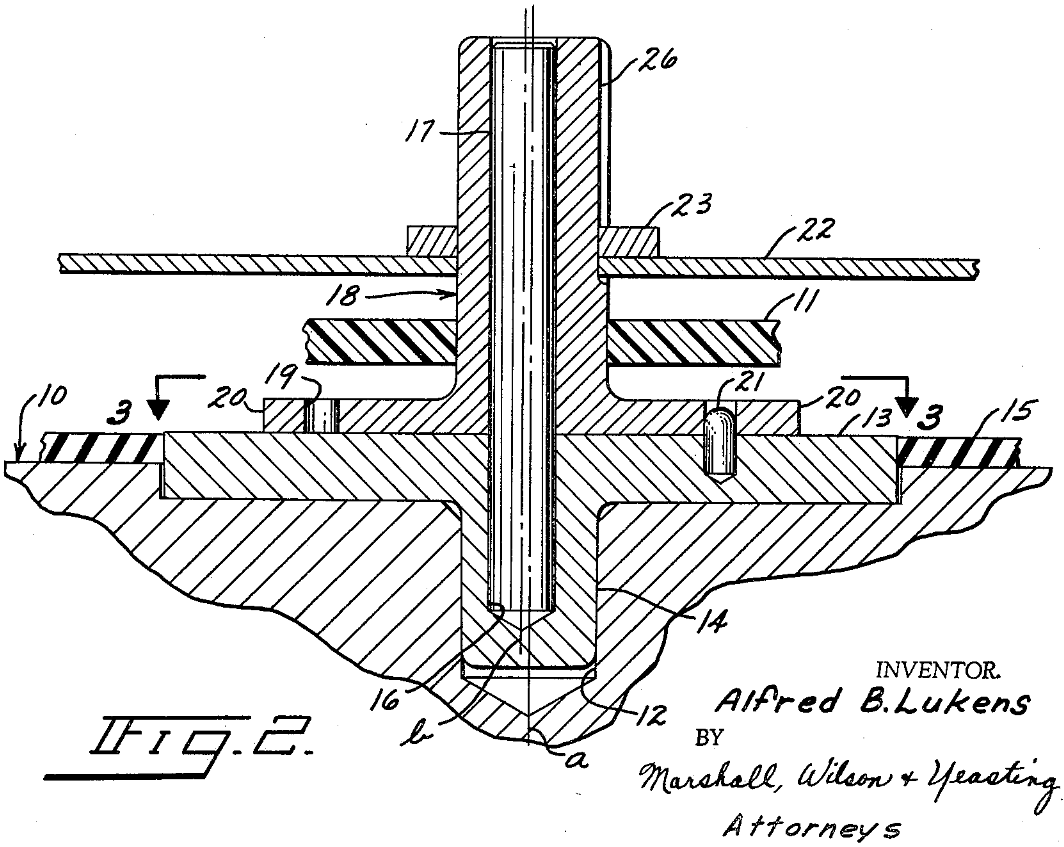
FIG. 2 is a fragmentary vertical section of the turntable on an enlarged scale.
Figure 3:
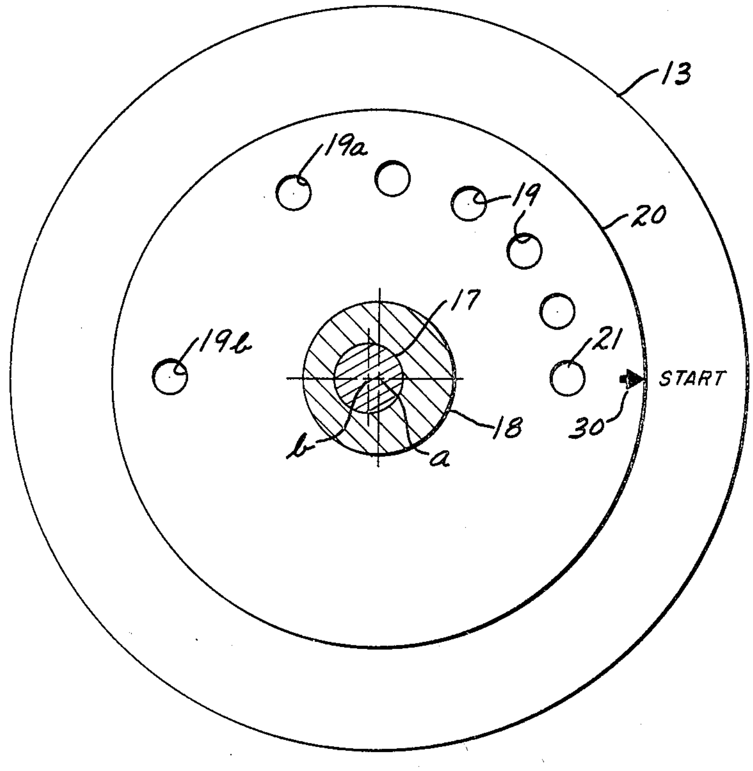
FIG. 3 is a horizontal section taken on the line 3—3 of FIG. 2.

As indicated in FIG. 3, the central axis of the spindle 18 is displaced from the axis *b* of the pivot pin 17 by a distance equal to the displacement of the axis *b* of the pin from the axis *a* of rotation of the turntable. As seen in FIG. 3, as well as in FIG. 2, the spindle 18 has been turned to a position in which has central axis of the spindle coincides exactly with the axis *a* of rotation of the turntable. The spindle 18 is provided with means for locating the spindle in a series of different angular positions relative to the turntable. In the apparatus shown in the drawings, this means consists of a series of holes 19 bored in an integral flange 20, each of which is of the proper size to fit on a pin 21 fixed in the circular plate 13.

A dial 22, for indicating the amount and direction of displacement of the central axis of the spindle relative to the axis of rotation of the turntable, is provided with a reinforcing central boss 23 and has a central hole 24 (FIG. 4) which fits on the spindle 18 and is provided with a flat 25 that cooperates with a flat 26 on the spindle to locate the dial 22 and to prevent it from rotating on the spindle.

Figure 5:
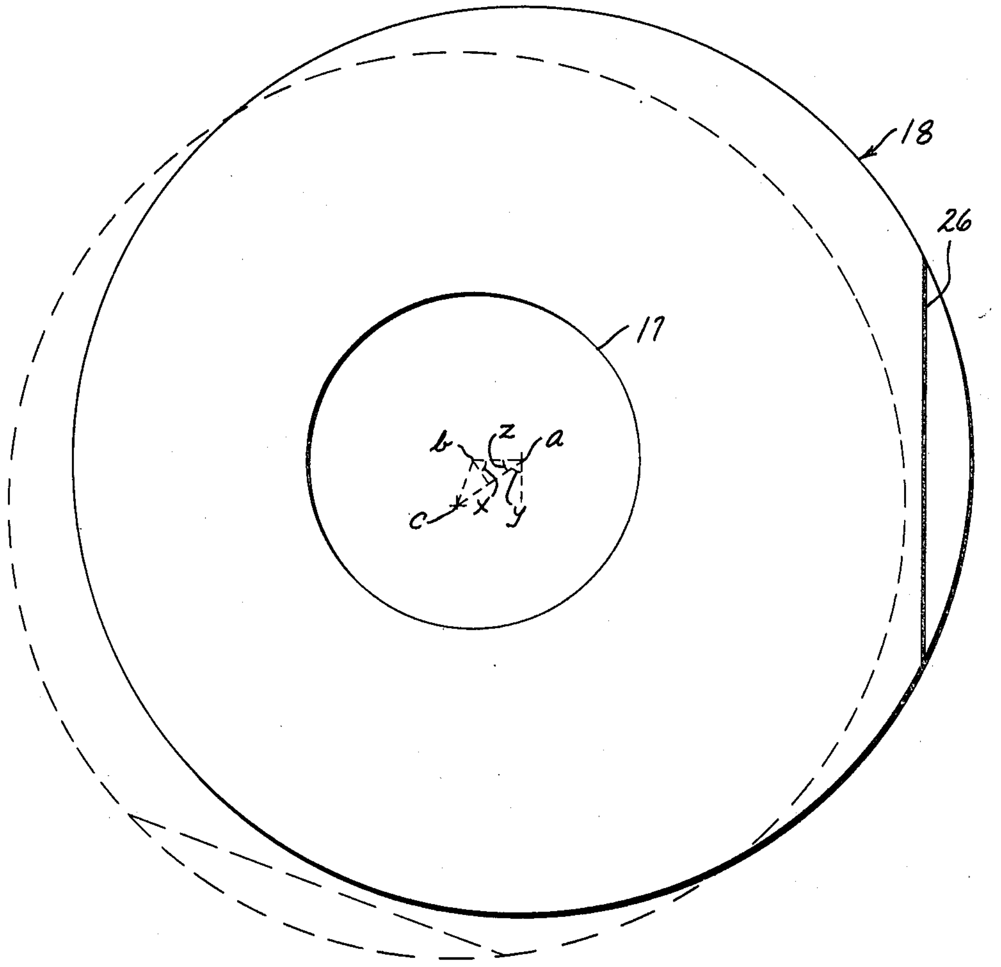
FIG. 5 is a diagrammatic plan view of the upper end of the spindle, on a still larger scale.

In FIG. 5 the spindle 18 is shown in full lines in the position that it occupies in FIGS. 2 and 3, when the axis of the spindle 18 coincides with the axis *a* of rotation of the turntable. FIG. 5 also shows in dotted lines the position that the spindle 18 occupies after it has been rotated clockwise through an angle somewhat more than 90°, to bring the sixth hole 19*a* upon the pin 21.

In the dotted line position of the spindle in FIG. 5, the central axis *c* of the spindle is displaced from the axis *a* of rotation of the turntable by a distance equal to the length of the dotted line *a–c*. Also, the angle through which the spindle has been rotated in its dotted line position in FIG. 5 is two times the angle *x*.

The direction in which the central axis *c* of the spindle has been displaced from the axis *a* of the turntable is given by the angle *y*, which is the angle between the line *a–c* and a line through *a*, perpendicular to *a–b*. Inspection of FIG. 5 shows that the angles *x* and *z* form the two acute angles of a right triangle, so that *x* is the complement of $z$. Since $y$ also is the complement of $z$, it follows that $y$ is equal to $x$. This geometric analysis establishes the general rule that the angle $y$, which gives the direction of the deviation of $c$ from $a$ is always equal to $x$, which is one-half the angle through which the spindle 18 has been rotated.

Also, the distance $a$–$c$, which is the distance between the central axis $c$ of the spindle and the axis $a$ of rotation of the turntable, is always equal to 2 sin. $x$ times the distance $a$–$b$, the distance $a$–$b$ being the distance between the axis $a$ of rotation of the spindle and the axis $b$ of the pivot pin 17.

In the preferred embodiment, the distance $a$–$b$, is .015 inch. Thus if the spindle 18 is rotated through an angle of 180° from the position in which it is shown in FIGS. 2 and 3, to bring the hole 19*b* onto the pin 21, the distance between the central axis $c$ of the spindle and the axis $a$ of rotation of the turntable will be two times $a$–$b$, or in the preferred embodiments .030 inch. Preferably the holes 19 are located in accordance with the principles hereinbefore discussed so that the central axis $c$ of the spindle 18 may be displaced from the axis $a$ of rotation of the turntable by successive increments of .005 inch. Thus when the hole 19*a* is located on the pin 21, the central axis $c$ of the spindle is displaced by .025 inch from the axis $a$ of rotation of the turntable.

As shown in FIG. 1, a small stand 27 supports a horizontal magnifying glass 28, and is movable so that the user can position the stand adjacent to the edge of the record. When the stand 27 is in position, a horizontal arm 29 carried by the stand extends just above the edge of the record. The horizontal arm 29 is graduated in hundreths of an inch. The graduations are numbered consecutively, the graduation which is most remote from the center of the turntable being marked zero.

In the operation of the apparatus, the spindle is first positioned as shown in FIGS. 2 and 3, with the arrow 30 on the flange 20 pointing to the word "start" inscribed on the circular plate 13. A record then is placed upon the turntable 10, and the turntable is rotated while the grooves in the record are observed through the magnifying glass 28. If the grooves appear to move back and forth relative to the graduations on the horizontal arm 29, the stand 27 is moved to a position such that the outermost groove of the record, in its outermost position, is just tangent to the zero graduation on the horizontal arm 29.

The outermost groove of the record then is observed as the record is rotated, and the graduations on the horizontal arm 29 are read to determine the number of hundredths of an inch by which the outermost groove appears to move from its extreme outermost position to its extreme innermost position during each rotation of the record. The value thus read, in hundredths of an inch, is actually equal to twice the distance between the center of symmetry of the record grooves and the axis of rotation of the turntable.

The dial 22 then is dropped upon the spindle 18 above the record 11. The next step is to position the circular plate 13 so that the zero graduation shown on the dial 22 in FIG. 4 indicates the direction in which the record must be displaced in order to bring the center of symmetry of the grooves into coincidence with the axis of rotation of the turntable. This can be done by observing the outermost groove of the record through the magnifying glass 28 and rotating the record by hand until the outermost groove has reached its extreme innermost position. Then if the boss 14 of the circular plate 13 has a sliding fit in the bore 12, the whole assembly can be rotated, while the record and turntable are held stationary, until the zero mark on the dial 22 is pointing directly at the horizontal graduated arm 29. If the circular plate 13 and its boss 14 are fixed so that they cannot be rotated relative to the turntable, it will be necessary first to place a mark on the record in line with the horizontal arm 29, to designate the direction in which the record needs to be displaced, and then to rotate the record on the turntable to bring that mark into registry with the zero mark on the dial 22.

When the parts and the record have been thus oriented, so that the zero mark on the dial 22 points in the direction in which the record needs to be displaced, a pencil is used to mark the record in accordance with the number of hundredths of an inch of movement of the grooves which has been observed through the magnifying glass 28. For example, if a movement of the grooves of .04 inch has been observed, two marks are placed upon the record immediately adjacent to the edge of the dial 22 and opposite to the two graduations marked "4" on the dial 22.

In the next step, the record and the apparatus are rotated relative to one another to bring the zero mark on the dial 22 opposite to the right hand pencil mark on the record. During all these operations, the spindle remains in its starting position relative to the plate 13, with the arrow 30 pointing to the word "start."

The spindle 18 is then lifted to disengage the flange 20 from the pin 21, and the assembly of the spindle 18 and the dial 22 is rotated clockwise until the zero mark on the dial is opposite to the left hand pencil mark which has been placed on the record. This brings the proper hole 19 over the pin 21, and the spindle 18 is then dropped so that the proper hole 19 engages the pin 21.

The effect of the foregoing operations is to displace the record on the turntable in the proper direction and by the proper amount to bring the center of symmetry of the grooves on the record substantially into coincidence with the axis of rotation of the turntable. In the preferred embodiment, the increments of displacement are .005 inch, so that the center of symmetry of the grooves can be brought within .0025 inch of the axis of rotation of the turntable. This is close enough so that the average listener cannot direct any "wow" variation in the pitch of notes reproduced from the record.

Figure 4:
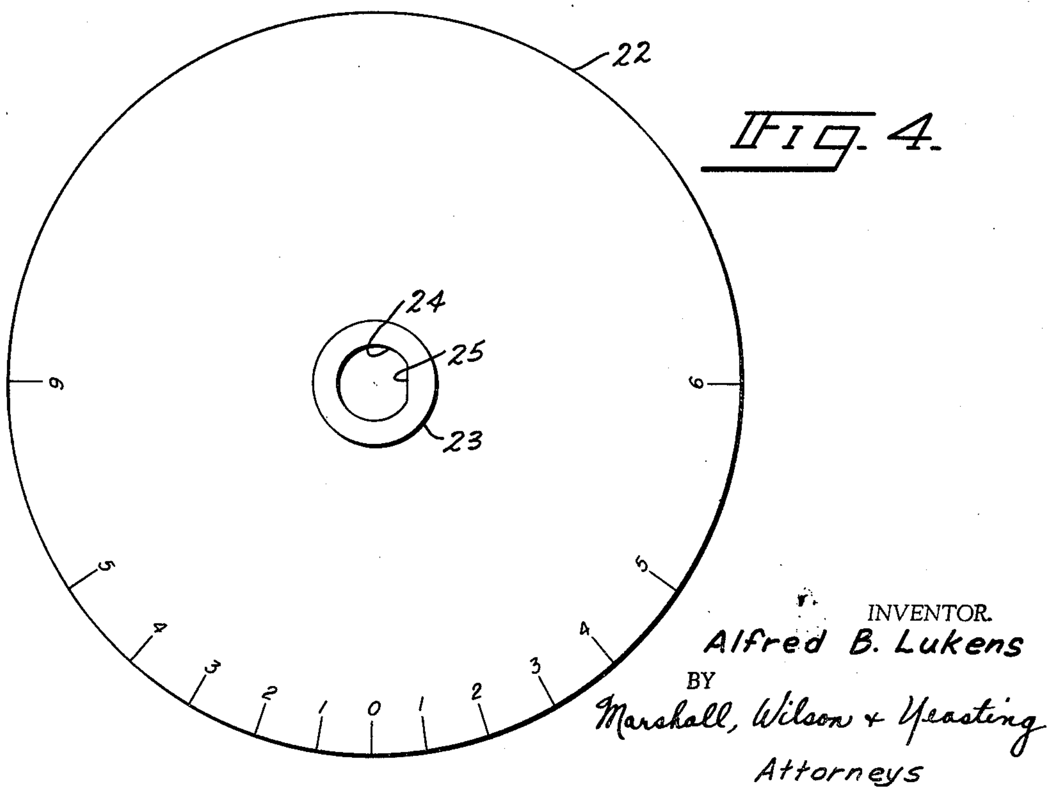
FIG. 4 is a plan view of the dial.

In FIG. 4, the six numbered graduations on the right side of the zero mark consist of lines radiating from the central axis of the spindle 18, which in the starting position coincides with the axis of rotation of the turntable. The angle through which each of these right hand graduations is displaced from the zero mark on the dial 22 is the angle which has been designated as $y$.

The six numbered graduations on the left side of the zero mark on the dial 22 consist of lines radiatiing from the axis of the pivot pin 17, which has been designated as $b$. The angle between one of the left hand graduations and the corresponding right hand graduation, using the point $b$ as the center, is equal to $2y$.

Once a record has been marked by the procedure hereinbefore described, each subsequent positioning of the record is a relatively simple operation. With the parts in the starting position shown in FIGS. 2 and 3, the record and the other parts are first oriented so that the zero mark on the dial 22 is opposite the right hadn pencil mark on the record. The spindle 18 is then lifted free of the pin 21, rotated clockwise to bring the zero mark on the dial into registry with the left hand pencil mark on the record, and then dropped to allow the pin 21 to enter the proper hole 19.

I claim:

1. A high precision record player comprising a turntable which is rotatable about a fixed axis, and a circular cylindrical record-locating spindle that has a central axis and is selectively rotatably mounted on the turntable to rotate about an axis which is parallel to the central axis of the spindle and to the axis of rotation of the turntable and is displaced an equal distance from both the central axis of the spindle and the axis of rotation of the turntable.

2. A high precision record player according to claim 1, comprising a dial which is fixable on the spindle, for indicating the amount and directin of displacement of the central axis of the spindle relative to the axis of rotation of the turntable in various angular positions of the spindle.

3. A high precision record player according to claim 1, comprising means for locating the spindle in a series of different angular positions relative to the turntable, including one position in which the central axis of the spindle coincides with the axis of rotation of the turntable.

4. A high precision record player according to claim 1, comprising means for locating the spindle in a series of different angular positions relative to the turntable, including one position in which the central axis of the spindle coincides with the axis of rotation of the turntable, and a dial which is fixable on the spindle, for indicating the amount and direction of displacement of the central axis of the spindle relative to the axis of rotation of the turntable in such positions of the spindle.

References Cited

UNITED STATES PATENTS 2,838,315 6/1958 Staar ---------------- 274—39

HARRY N. HAROIAN, Primary Examiner

U.S. Cl. X.R.

274—1, 10